UNITED STATES PATENT OFFICE.

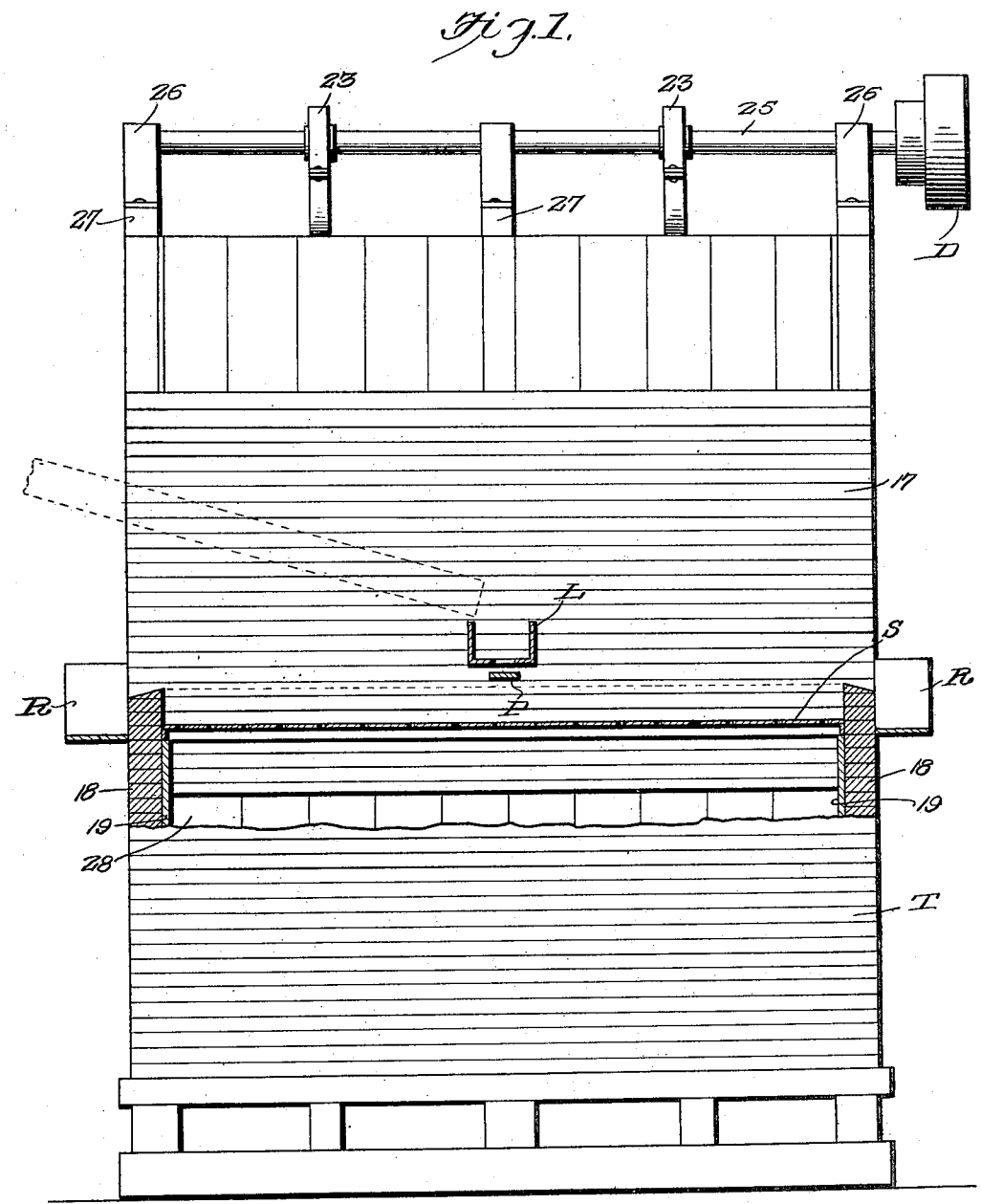

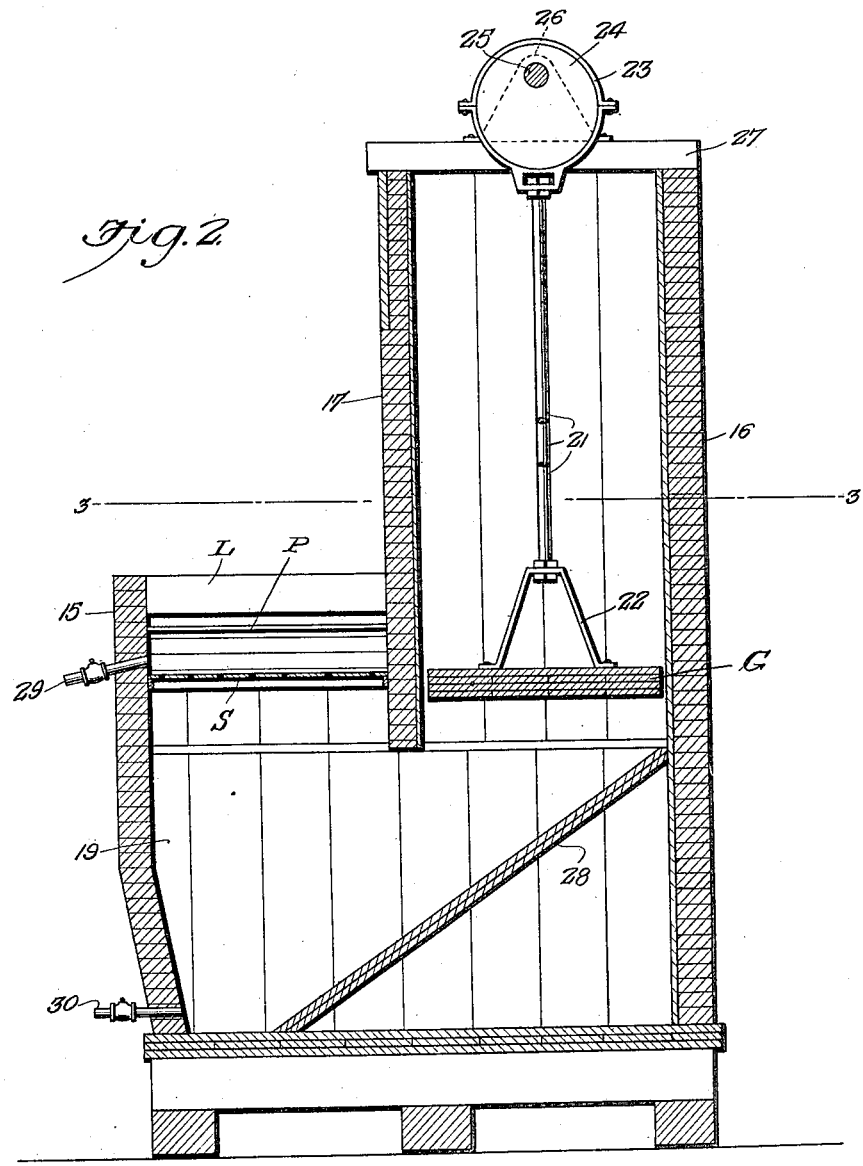

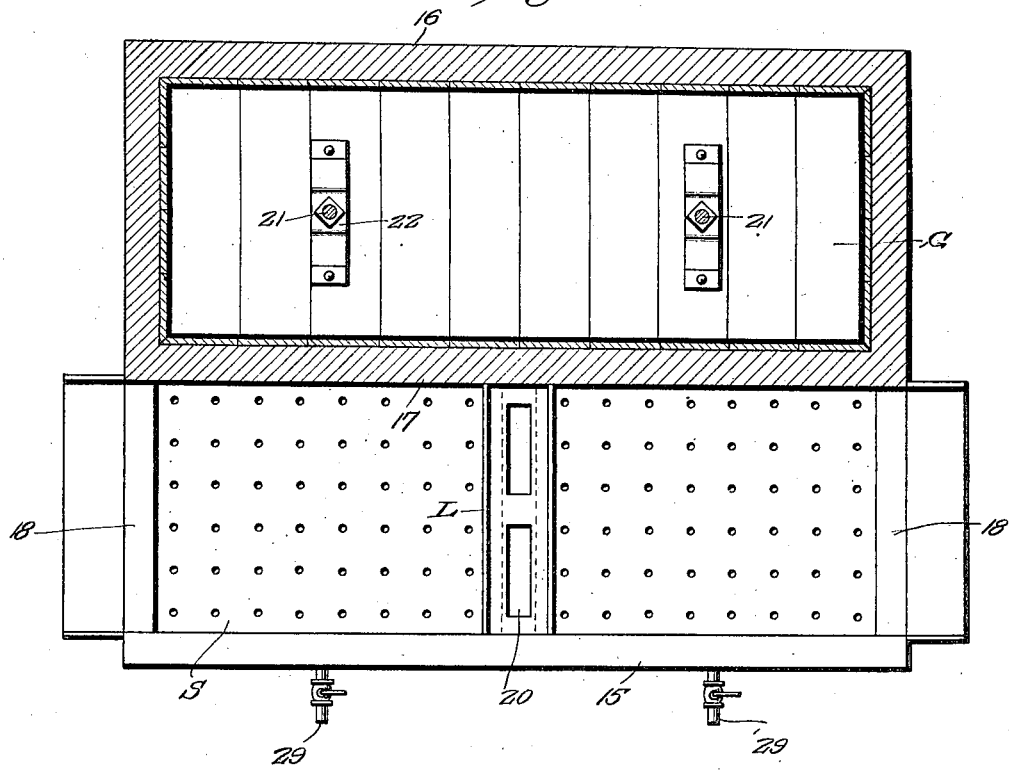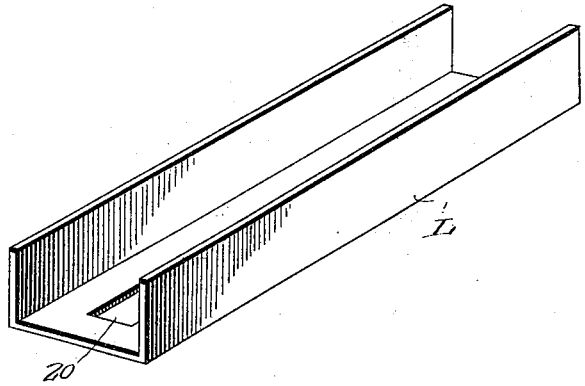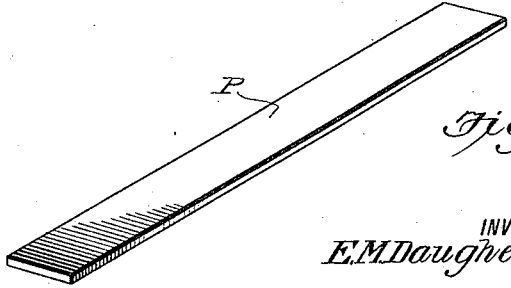

ELMO MURRAY DAUGHERTY, OF WEBB CITY, MISSOURI, ASSIGNOR OF ONE-HALF TO ANDY J. POYNOR, OF JOPLIN, MISSOURI.

ORE JIG.

1,402,303.  Specification of Letters Patent.  Patented Jan. 3, 1922.

Application filed July 24, 1920. Serial No. 398,662.

*To all whom it may concern:*

Be it known that I, ELMO MURRAY DAUGHERTY, a citizen of the United States, and a resident of Webb City, in the county of Jasper, and State of Missouri, have invented certain new and useful Improvements in Ore Jigs, of which the following is a specification.

My invention relates to ore-jigs and particularly to supplementary ore-jigs adapted to be used in conjunction with or as a part of a jig of the Harz type.

In jigs of the Harz type, the screens and overflow lines are so inclined that the depth of the mineral bed is considerably greater on the feed end than on the discharge end of a screen which, as a natural consequence causes restricted and unequal settling conditions throughout the length of the mineral bed. As a result of this fact, it is evident that the pulsating and upward rising current of water from below will seek an outlet at the point of least resistance, this point being near the discharge end of the sieve where the mineral bed is thinnest. This obviously causes an excessive activity on the discharge end of the mineral bed, or insufficient activity on the head end thereof. Under the latter condition much fine free ore and coarser middling products will not settle to their place on the head end of the mineral bed so that on nearing the discharge end where the pulsating and upward rising current of water is much stronger, a large portion of the ore is forced over onto the next cell below and so on throughout the entire length of the jig, and are finally lost in tailing discharges.

Jigs of the Harz type are usually provided with five to seven cells or compartments, each cell having an independent or separate water supply which overflows into the next succeeding cell below it, and as a result of this condition the volume of the ore-feed water and the overflow of the jig supply of water is added to on passing each succeeding cell so that on nearing the discharge end of the jig, the volume and velocity of this water becomes so great that fine ores and minerals are transported the full length of the lower screen in suspension with such waters. This causes further losses of the ores.

It is a purpose of my invention to eliminate all of the above mentioned objections by providing a supplementary jig which may be incorporated in a jig of the Harz type or formed independently of the same and associated with the discharge end thereof, such jig including a sieve disposed in a true horizontal plane so as to form an overflow line in the same plane whereby provision is made for the free and very nearly equal action of the ore bed throughout the length of the screen, and thereby providing for free settling conditions and higher ore recoveries. Furthermore, my invention includes means for introducing the ore feed into the middle of the screen and dividing both the overflow water and the ore-feed in about equal parts with each part flowing in opposite directions. This division produces freer settling conditions and enables the recovery of coarse, low gravity, middling products which are otherwise often lost. It furthermore reduces the velocity of the overflow of water which enables the recovery of fine free ores or minerals which are in the event of a high velocity of overflow water, often lost.

I will describe one form of jig embodying my invention as a supplementary jig, and will then point out the novel features thereof in claim.

In the accompanying drawings:

Figure 1 is a view partly in section and showing in front elevation one form of jig embodying my invention.

Figure 2 is a vertical sectional view of the jig shown in Figure 1.

Figure 3 is a transverse sectional view taken on the line 3—3 of Figure 2.

Figure 4 is an enlarged detail perspective view of the feed launder shown in the preceding views.

Figure 5 is a view similar to Figure 4 showing the baffle plate shown in Figures 1, 2 and 3.

Similar reference characters refer to similar parts in each of the several views.

My invention, in its present embodiment comprises a tank designated generally at T and including a front wall 15, a rear wall 16 extending to a greater height than the front wall, and an intermediate wall or partition 17 disposed equi-distant between the two and extending to a point slightly below the upper edge of the front wall 15. The tank T also includes end walls 18 which as shown in Figure 1 are beveled at their upper edges. Arranged between the end walls 18 and the front and intermediate walls 15 and 17 is a screen or sieve S supported at its ends upon plates 19. Arranged above the screen S and disposed at a point medially of its ends is a feed launder L which as shown in Figure 1 is of U-shape in cross section, and which as shown in Figure 3 has its bottom wall provided with a pair of slots 20. The detailed construction of the launder L is clearly shown in Figure 4. Interposed between the screen S and the launder L at a point directly below the openings 20 is a baffle plate P, the same being of rectangular formation as shown in Figure 5, and of a width which exceeds the width of the openings 20.

As shown in Figure 1, the screen S is supported below the upper edges of the end walls 18 and occupies a truly horizontal position. As a result of this arrangement the overflow line indicated in dash lines in Figure 1 is also in a truly horizontal plane. Upon the outer sides of the end walls 18 are positioned tailing troughs R which are designed to receive the tailings overflowing from the screen S, as will be understood.

As shown in Figure 2, the partition 17 and the rear wall 16 coact to provide a shaft or well in which is adapted to work a plunger designated at G. The plunger G is supported for reciprocating movement by means of a pair of rods 21 secured to the upper side of the plunger at points adjacent its opposite ends by means of yokes 22. The rods 21 are in turn connected to split sleeves 23 which embrace cams 24 fixed to a shaft 25. As shown in Figure 1, the shaft 25 is journaled at suitable points in bearings 26 supported on beams 27 arranged in spanning relation with respect to the walls 16 and 17. One end of the shaft 25 is provided with a drive pulley D of such dimensions and weight as to serve as a balance wheel for the shaft 25. As will be understood, power is supplied to the pulley D after effecting a rotation of the shaft 25, which latter in turn causes the reciprocating movement of the plunger G within the well through the medium of the cams 24. As shown in Figure 2, the cams 24 are eccentrically mounted upon the shaft 25 and are set to the same degree of eccentricity so as to effect a synchronous movement of the two rods 21.

As illustrated to advantage in Figure 2, that portion of the tank T below the partition 17 constitutes a hutch in which is arranged an inclined partition 28. Drain pipes 29 and 30 extend through the front wall 15 and communicate with the tank above and below the screen S, respectively.

In operation, the ore and water from the discharge end of a jig of the Harz type is fed into the launder L, preferably through a trough arranged at right angles to the launder L as shown in dash lines in Figure 1. This feed upon entering the launder L passes through the openings 20 and onto the baffle plate P where it is divided into about equal parts, each part flowing in opposite directions on the screen S. The fine minerals or sands, together with the coarser middling products, pass through the screen S and into the hutch below, where it is drawn out through the pipe 30 for further treatment. The middling products which are larger than the mesh of the screen are drawn off by means of the usual gate (not shown) while the tailing products pass over the end walls 18 and into the troughs R where they may be conveyed directly to the waste piles. It is to be understood that during this operation the plunger G is actuated to effect a circulation of the feed within the hutch in first one direction and then the other.

As the screen S occupies a truly horizontal position and the overflow line is also in a horizontal plane, it will be clear that a free and very nearly equal action of the ore bed is effected throughout the length of the screen thereby providing for free settling conditions and higher ore recoveries. The baffle plate P effectively retards the flow of feed water thus enabling the recovery of ores which are ordinarily lost owing to the high velocity of the feed water.

Although I have herein shown and described only one form of jig embodying my invention, it is to be understood that various changes and modifications may be made herein without departing from the spirit of the invention and the spirit and scope of the appended claim.

What I claim is:

A jig comprising a tank, a screen arranged in a horizontal plane within the tank and disposed below the end walls thereof to provide an over-flow line therein also in a horizontal plane, tailing troughs arranged adjacent the ends of the tank, a launder of U-shaped cross section above and midway between the ends of the screen, said launder having a plurality of elongated openings in the bottom thereof, and a stationary baffle plate directly below said openings which is co-extensive in length with the launder and is disposed in spaced parallel relation below the launder and above said screen so as to allow the free movement of the ore from the launder to the baffle plate and a uniform distribution of the ore from the baffle plate over the surface of the screen.

ELMO MURRAY DAUGHERTY.